Aug. 22, 1967
W. L. CARTER
3,337,128
CALORIE AND GRAM INDICATOR
Filed Oct. 11, 1965
2 Sheets-Sheet 1
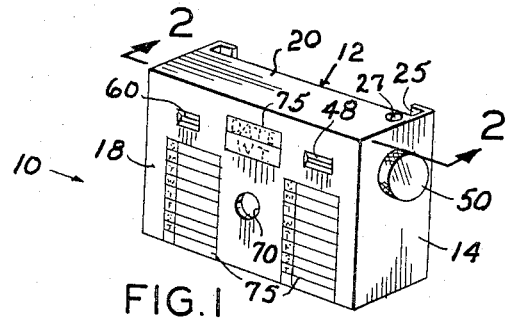
FIG. 1
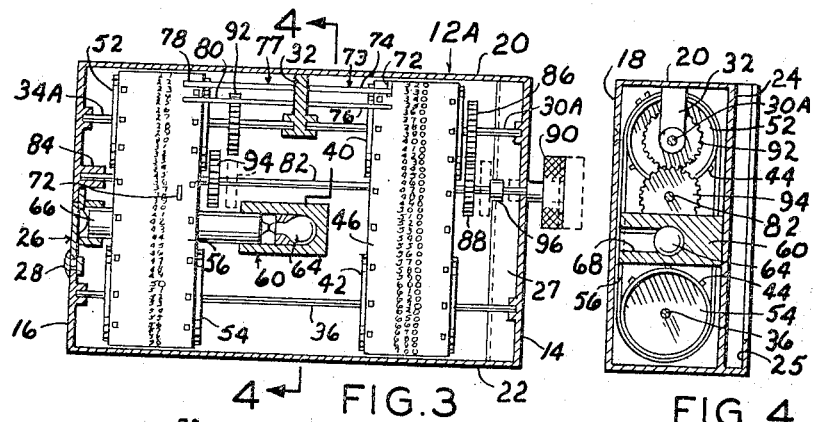
FIG. 3
FIG. 4
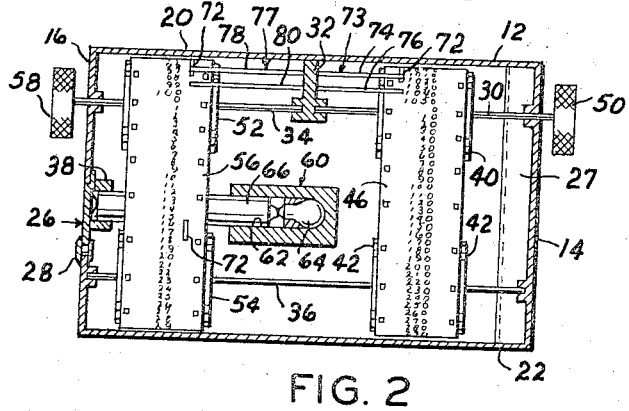
FIG. 2
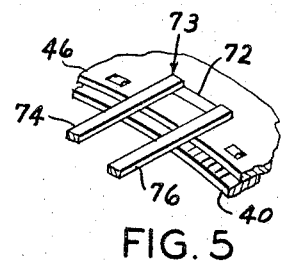
FIG. 5
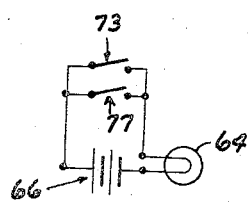
FIG. 11
WILLIAM L. CARTER
*INVENTOR*
BY
*Robert K. Rhea*
AGENT Aug. 22, 1967 W. L. CARTER 3,337,128
CALORIE AND GRAM INDICATOR
Filed Oct. 11, 1965 2 Sheets-Sheet 2

WILLIAM L. CARTER
*INVENTOR.*

BY

*Robert K. Rhea*
AGENT

United States Patent Office 3,337,128
Patented Aug. 22, 1967

3,337,128
CALORIE AND GRAM INDICATOR
William L. Carter, 2801 S. Air Depot,
Midwest City, Okla. 73110
Filed Oct. 11, 1965, Ser. No. 494,557
2 Claims. (Cl. 235—71)

ABSTRACT OF THE DISCLOSURE

A pair of indicia marked bands are entrained around two pairs of drums mounted on spaced-apart axles extending longitudinally through a substantially rectangular closed housing having openings in one wall for viewing the indicia on the bands. Ratchet wheels, mounted on one axle and connected with the respective pairs of drums, rotate the bands which in turn complete a signal means in response to the selected direction of movement of a control wheel mounted on the axle.

The present invention is a continuation-in-part of an application filed by me in the United States Patent Office on Aug. 25, 1965, under Ser. No. 482,376 for Calorie Indicator.

It is important that persons on diets presently popular keep track of the calories or grams consumed each meal and as a total for the day. This is necessary so that the individual will not damage his health by a diet too low in total grams or calories per day.

The above referred to application provided a means for indicating calories but does not include a means for indicating calories and grams.

It is, therefore, the principal object of this invention to provide a device for recording the total calories and the total grams consumed for each meal and as a total for the day.

Another object is to provide a recorder which is of simplified construction and may be, therefore, manufactured and marketed at a relatively low cost.

Another object is to provide a means for totaling the calories or grams for each meal as an aid for the user of the device in restricting his diet to a total allowable for each meal or for the day.

Another object is to provide a device of this class having a pocket or recess for holding gram and calorie value charts for ascertaining the grams or calories of food to be eaten.

Still another object is to provide a device wherein the user may have a record of calories or grams or both consumed each meal, as a total for the day and a weekly total. This also serves as a weekly record to be presented to the user's doctor.

Yet another object is to provide a device which actuates a signal or alarm for indicating the total allowable calories or grams consumed or about to be consumed for each meal.

The present invention accomplishes these and other objects by providing a housing having axles therein and drums carried by the axles having indicia marked bands entrained therearound and visible through one or more apertures in one wall of the housing. Means is provided for rotating the bands and actuating a signal or warning at predetermined times.

Figure 6:
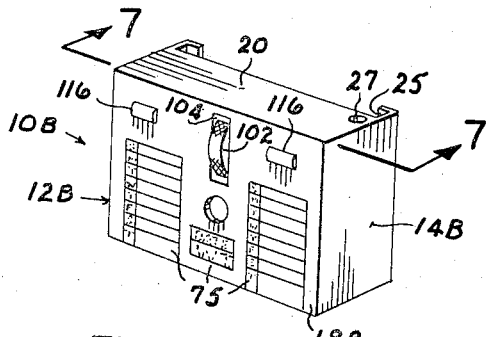
Figure 8:
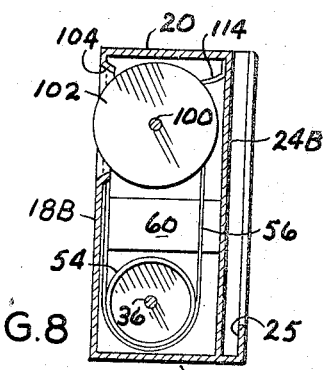
Figures 7, 10:
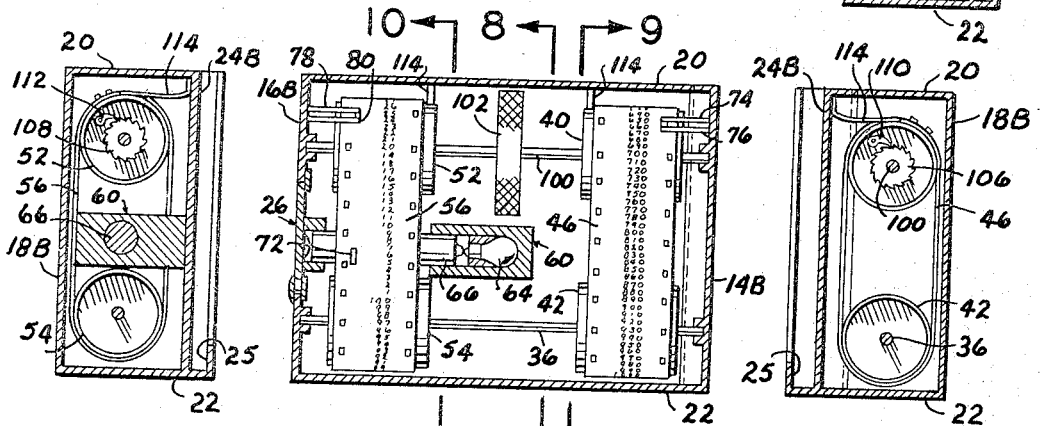
Figure 9:
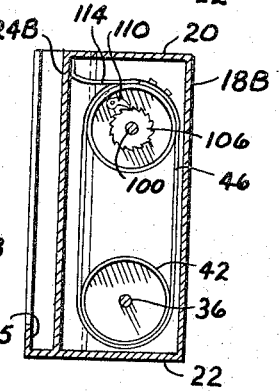

Other objects will be apparent from the following description when taken in conjunction with the accompanying two sheets of drawings, wherein:

FIGURE 1 is a perspective view of a preferred embodiment of the device;
FIGURE 2 is a vertical cross-sectional view taken substantially along the line 2—2 of FIG. 1;
FIGURE 3 is a view similar to FIG. 2 illustrating another embodiment of the device;
FIGURE 4 is a vertical cross-sectional view taken substantially along the line 4—4 of FIG. 3;
FIGURE 5 is a fragmentary perspective view, to a larger scale, illustrating electrical contacts used;
FIGURE 6 is a perspective view of another embodiment of the device;
FIGURE 7 is a vertical cross-sectional view taken substantially along the line 7—7 of FIG. 6;
FIGURES 8, 9 and 10, are vertical cross-sectional views taken substantially along the lines 8—8, 9—9 and 10—10, respectively, of FIG. 7; and
FIGURE 11 is a wiring diagram.

Like characters of reference designate like parts in those figures of the drawings in which they occur.

In the drawings:
The reference numeral 10 indicates the device, as a whole, which is rectangular in general configuration. The device 10 includes a housing 12 having opposing end walls 14 and 16, a front wall 18, a top and bottom 20 and 22 joined to a back wall 24.

The end walls 14 and 16 and bottom 22 are extended rearwardly a relatively short distance and turned inwardly at right angle parallel with respect to the back wall 24 to form an upwardly and rearwardly open pocket 25. The purpose of the pocket 25 is to removably receive and hold small pamphlets or charts indicating gram and calorie values of foods or the like.

The end wall 16 is provided with an access door or plate 26 removably held in place by a latch or catch 28 for access to the interior of the housing for reasons which will readily be apparent.

Referring more particularly to FIG. 2 a first axle or shaft 30 extends longitudinally into the housing 12 through the end 14 and is journaled at its innermost end by a support 32 connected with and depending from the inner surface of the top wall 20 medially the ends of the latter. A second axle or shaft 34 extends inwardly of the housing through the end wall 16 in axial alignment with respect to the axle 30 and is similarly journaled at its inward end by the support 32. A third or idling axle 36, parallel with respect to the axles 30 and 34, is journaled at its respective ends by the end walls 14 and 16.

A pair of drums 40 and 42 are mounted on the axles 30 and 36 in aligned relation. The drum 40 is secured to the axle 30 for rotation therewith while the drum 42 turns on the axle 36. The drums 40 and 42 are preferably provided at their respective peripheral edges with a plurality of circumferentially spaced teeth 44. An endless belt or band 46, similar in appearance and construction to a strip of 35 mm. film having spaced-apart apertures adjacent its marginal edges, is entrained over the drums 40 and 42 with the apertures in the band cooperatingly received by the teeth 44. The band 46 is marked or printed with indicia progressively indicating calories consumed or to be consumed by the user. The band 46 is preferably marked in a progression series of tens from 0 to 1050. A slit-like aperture or opening 48 is formed in the front wall 18 of the housing so that the indicia scored on the band 46 may be successively viewed therethrough. A wheel or disk 50 is secured to the outwardly projecting end of the axle 30 for rotating the drums 40–42 and the band 46.

A pair of similar drums 52 and 54 are mounted on the axles 34 and 36 in aligned relation. The drum 52 is preferably secured to the axle 34 so that a similar endless band 56, entrained therearound, may be rotated. The band 56 is scored with indicia for indicating grams in series from 0 to 100. Similarly a wheel or disk 58 is secured to the outwardly projecting end of the axle 34 for rotating the drums 52–54 and band 56. A second aperture or opening 60 is formed in the housing front wall 18 to view the indicia on the band 56.

A battery and signal holding support 60 is connected to the inner surface of the back wall 24 and projects toward the front wall. The support 60 is provided with a socket 62 opening toward the end wall 16. The socket receives a signal means, such as a lamp 64, and one end portion of a dry cell battery 66. The other end portion of the battery 66 is supported by a socket-like support 38, secured to the inner sufrace of the door 26. The battery support 60 is provided with a lateral opening 68 aligned with an aperture or opening 70 formed in the housing front wall 18.

Adjacent one of its marginal edges the outer surface of each of the bands 46 and 56 is provided with printed or painted electrical conducting strips 72. A first switch 73 comprising a pair of switch arms 74 and 76, supported at one end, as for example, by the axle support 32 project, at their other end portions, toward and resiliently contact, slidably, the outer surface of the band 46 as it is entrained over the drum 42. The switch arms 74 and 76 are respectively connected by wiring to the battery 66 and lamp 64 (FIG. 11). The conductive strips 72 are positioned on the band 46 so that when a certain figure appears in the window 48, for example 350, the switch arms are in contact with one of the strips 72 thus completing a circuit to light the lamp as a warning that the total allowable calories for that meal has been reached. Other similar strips 72 are positioned on the band 46 for actuating a warning for the totals of 700 and 1050 calories.

Eraseable panels 75 are positioned on the front wall for recording the date, user's weight and daily total grams or calories per week. A pencil holding well 27 extends into the housing through the top adjacent the end 14.

A second switch 77 comprising a similar pair of arms 78 and 80 similarly contacts the surface of the band 56 and makes with the conductive strips 72 placed thereon to indicate limits of total grams, as for example, the totals 20, 40, 60, 80 and 100.

Referring more particularly to FIGS. 3 and 4, the numeral 12A indicates a housing formed identical with respect to the housing 12 having a first axle 30A journaled at its inner-most end by the support 32 and journaled at its other end by the housing end wall 14. Similarly the second axle 34A is journaled at its respective ends by the support 32 and the end wall 16. The idling axle 36 is similarly journaled by the end walls 14 and 16. The drums 40 and 42 and entrained band 46 are similarly mounted on the axles 30A and 36. The drums 52 and 54 and their band 56 are similarly mounted on the axles 34A and 36. A fourth or driving axle 82 extends through the end wall 14 toward the wall 16 where it is journaled for longitudinal sliding movement by a bearing-like support 84 secured to the inner surface of the end wall 16. A toothed wheel or gear 86 is secured to the axle 30A between the drum 40 and the end wall 14. A mating toothed wheel or gear 88, secured to the axle 82, mates with the gear 86 so that when a hand wheel 90, secured to the outwardly disposed end of the axle 82, is rotated, the gears 86 and 88 progressively rotate the band 46. Similarly a pair of toothed wheels or gears 92 and 94 are mounted on the axles 34A and 82 in spaced relation with respect to the drum 52 and in normally off-set relation. Thus, rotation of the knob or hand wheel 90 moves the calorie recording band 46 but does not move the gram recording band 56. When it is desired to move the gram recording band 56, the knob 90 is moved longitudinally outward from the housing end wall 14 so that a stop 96, secured to the shaft 82, contacts the inner surface of the end wall 14 thus disengaging the gears 86 and 88 and engaging the gears 92 and 94 so that rotation of the knob 90 then rotates the band 56. The housing 12A is similarly provided with the battery and lamp holding support 60 containing the lamp 64 and battery 66 which are connected with the switch arms 74–76 and 78–80 to make with conductive strips 72 on the bands 46 and 56 in the manner described hereinabove for FIG. 2.

Referring more particularly to FIGS. 6 through 10, the reference numeral 10B indicate a device similar in most respects to the device 10. A first axle 100, replacing the axles 30 and 34, extends between and is journaled by the end walls 14B and 16B. The axle 100 journals the drums 40 and 52. A control wheel or disk 102, diametrically greater than the drums 40 and 52, is axially secured to the axle 100 medially its ends. The front wall 18B is provided with a recess or indentation 104 to permit an arc of the periphery of the disk 102 to project outwardly therethrough for manually rotating the disk 102. Ratchet wheels or disks 106 and 108 are secured to the axle within the drums 40 and 52, respectively. The periphery of the ratchet wheels 106 and 108 are provided with ratchet teeth disposed in opposing directions. Spring urged pawls or dogs 110 and 112 are pivotally connected with the respective drum 40 and 52 so that their free end portion is engaged with the ratchet teeth on the respective ratchet wheel 106 and 108. Thus when the control disk 102 is manually rotated in one direction the pawl 110 engages the teeth of the ratchet wheel 106 and rotates the drum 40 to progressively move the entrained calorie recording band 46. During this action the ratchet wheel 108 is rotating in an opposite direction wherein the pawl 112 permits such rotation and allows the drum 52 to remain stationary. Conversely, when the control disk 102 is manually rotated in the opposite direction the pawl 112 engages the teeth on the ratchet wheel 108 and rotates the drum 52 and entrained gram recording band 56 while the drum 40 remains stationary. To insure the drums 40 or 52 remaining stationary while the other one is being turned a spring member 114, connected at one end to the inner surface of the back wall 24B, frictionally contacts, at its other end portion, a portion of the periphery of the respective drum 40 and 52 to form a brake.

Since the indicia on the bands 46 and 56, as it appears through the openings 48 and 60, is relatively small magnifying lens 116 are preferably positioned over these openings (FIG. 6).

In this embodiment, the switch arms 74–76 and 78–80 are preferably supported by the respective end wall 14B and 16B to perform their function as explained hereinabove for FIG. 2.

Obviously the invention is susceptible to some change or alteration without defeating its practicability, and I therefore do not wish to be confined to the preferred embodiment shown in the drawings and described herein, further than I am limited by the scope of the appended claims.

I claim:

1. An indicating device, comprising: a housing having a front wall, top, bottom and end walls joined to a back wall, said front wall having a plurality of apertures; upper and lower axles extending between and journaled by said end walls adjacent said top and bottom walls respectively; two pairs of drum means respectively mounted on said axles in aligned relation; an endless band entrained, respectively, over said two pairs of drums; control means for rotating each pair of said two pairs of drums, said control means comprising a control wheel secured to said upper axle medially its ends, a toothed ratchet wheel secured to said upper axle within each said drum mounted on said upper axle, a spring urged pawl mounted on each said drum mounted on said upper axle, said pawls each having a free end engaging the teeth of the respective said ratchet wheel for rotating each respective pair of said pairs of drums when said control wheel is alternately rotated in different directions; and signal means actuated by the movement of said two pairs of drums at predetermined times.

2. Structure as specified in claim 1 in which said signal means comprises, a dry cell battery, a lamp, a pair of switches, said switches each having a pair of spaced-apart contact arms slidably contacting the outer surface of each said endless band, spaced-apart electrical conductive strips secured to the outer surface of each said endless band for closing said switches at predetermined times, and wiring interconnecting said switches with said battery and said lamp.

References Cited
UNITED STATES PATENTS

| | | | |
|---|---|---|---|
| 649,590 | 5/1900 | Thrasher | 58—126.2 |
| 1,879,641 | 9/1932 | Sunkenberg et al. | 58—148 |
| 2,072,457 | 3/1937 | Larrabee | 58—2 |
| 2,229,100 | 1/1941 | Lapsley | 346—37 |
| 2,804,041 | 8/1957 | Neugass | 116—135 |
| 2,897,721 | 8/1959 | Cohn et al. | 88—28 |
| 3,024,590 | 3/1962 | Wynne | 116—135 |

FOREIGN PATENTS

| | | |
|---|---|---|
| 806,680 | 6/1951 | Germany. |

RICHARD B. WILKINSON, *Primary Examiner.*

S. A. WAL, *Assistant Examiner.*